US006742402B1

United States Patent
Volz et al.

(10) Patent No.: US 6,742,402 B1
(45) Date of Patent: Jun. 1, 2004

(54) STEERING-ANGLE SENSOR

(75) Inventors: Peter Volz, Darmstadt (DE); Jochen Burgdorf, Offenbach (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/700,868
(22) PCT Filed: May 20, 1999
(86) PCT No.: PCT/EP99/03472
§ 371 (c)(1),
(2), (4) Date: Mar. 9, 2001
(87) PCT Pub. No.: WO99/59861
PCT Pub. Date: Nov. 25, 1999

(30) Foreign Application Priority Data

May 20, 1998 (DE) .......................... 198 22 815

(51) Int. Cl.$^7$ ................................. G01L 3/02
(52) U.S. Cl. ................................. 73/862.192
(58) Field of Search ............... 73/862.08, 862.322, 73/862.192

(56) References Cited

U.S. PATENT DOCUMENTS

| 5,002,404 A | 3/1991 | Zernickel et al. |
| 5,248,939 A | 9/1993 | Brauer |

FOREIGN PATENT DOCUMENTS

| DE | 42 07 719 | 9/1993 |
| DE | 42 28 719 | 3/1994 |
| DE | 42 43 875 | 7/1994 |
| DE | 44 12 196 | 10/1995 |
| DE | 196 01 964 | 7/1997 |
| DE | 197 12 523 | 11/1997 |
| DE | 197 23 430 | 1/1998 |
| EP | 0 619 472 | 10/1994 |
| JP | 61 200422 | 9/1986 |

OTHER PUBLICATIONS

Search Report of the German Patent Office for Application No. 198 22 815.5.

*Primary Examiner*—Max Noori
(74) *Attorney, Agent, or Firm*—Rader, Fishman & Grauer PLLC

(57) ABSTRACT

Multiple forces act upon a steering spindle. Further, the mounting support of the steering spindle and the steering spindle itself are affected by tolerances, as a result of which the steering spindle with its longitudinal axis is moved radially relative to the vehicle chassis. Control devices for controlling the vehicle dynamics require steering angle sensors which have to indicate the current steering angle and variations thereof with great precision. If the steering angle is invariably fixed with respect to the chassis frame, the measurement frequently becomes inaccurate due to the radial movement of the spindle axis. As a remedy, the present invention arranges for the steering angle sensor to be positioned in the area of a spindle bearing. Favorable improvements relate to linking the sensor housing to the housing of the spindle bearing.

11 Claims, 4 Drawing Sheets

STEERING-ANGLE SENSOR

TECHNICAL FIELD

The present invention generally relates to steering angle sensors and more particularly relates to systems for attaching a steering angle sensor in a vehicle.

BACKGROUND OF THE INVENTION

An attachment of this type is e.g. known from U.S. Pat. No. 5,002,404 A which, especially in FIG. 2, discloses an attachment of a steering angle sensor in a vehicle including a steering column and a steering spindle pivoted therein, wherein a sensor housing is held unrotatably in the area of the steering spindle bearing.

The basic design of steering angle sensors is known in the art, see DE-OS 196 01 964.8, for example. In systems for controlling vehicle dynamics, especially, for controlling the yaw rate (in ESP programs), it is necessary to sense the steering angle with high precision and without faults. Normally, steering columns and steering angle sensor connections cannot be easily manufactured with the degree of precision desired. This is due to: high costs, radial adjustment of the steering wheels, axial adjustment of the steering wheels, clamping function of the adjustment, mounting tolerances in the vehicle, steering forces cause elastic deformations.

According to the current state of the art, the bearings between the steering shaft and the vehicle fixing points must be mounted in rubber, at least in part, to provide ease of motion of the steering unit and isolate it from vibrations.

An object of the present invention is to provide an attachment of a steering angle sensor wherein an exact allocation of the axes of rotation of shaft and sensor is maintained under all operating conditions, in spite of the above requirements.

SUMMARY OF THE INVENTION

The principle of the present invention basically includes that the center line of the sensor housing (1) and the axis of rotation of the steering spindle (2) in the sensor area are congruent. This way the influences which cause an offset positioning of the steering spindle bearing (6) and, thus, of the axis of rotation (15) of the steering spindle (2) in relation to the sensor housing will not take effect because the position of the sensor housing (1) is displaced accordingly along with the offset positioning of the axis of rotation (15). The same applies to the entraining member (4) which is also displaced along with the offsetting of the axis of rotation (15) and, thus, maintains its correct allocation in relation to the sensor housing (1). In contrast hereto, the sensor housing is rigidly connected to the vehicle chassis in previous disclosures so that a movement of the longitudinal axis of the spindle in relation to the center line of the sensor housing could lead to wrong measurements or even damages to the sensor.

A particularly tight coupling of the steering angle housing to the position of the steering spindle is achieved by the present invention. This is because the outside bush of the roller bearing normally has only very narrow tolerances in relation to the inside bush and, hence, the position of the steering spindle or shaft (2). Because the outside bearing bush and, thus, also the sensor housing precisely follows the radial movement of the spindle axis, any possible tumbling movements of the spindle have no influence on the position of the sensor (1) in relation to the spindle (2).

As far as the attachment of the sensor to the outside bearing bush is concerned, said may be achieved by means of a connecting member which is rigidly seated on the outside bearing bush or is detachably connected to the latter. The connecting member can also be integrally connected to the outside bearing bush so that the outside bearing bush simultaneously represents the connecting member to the sensor housing.

Special advantages of the present invention are realized when the swing support (8) is rotated about the fulcrum (16), and simultaneously, the tiltable part of the steering spindle is also tilted. This maintains the position of the sensor housing (1) in relation to the spindle or shaft (2) such that it does not change. It is not absolutely necessary that an elastic torsional bar, e.g. made of rubber, is provided in the swing support (8). The present invention is very favorable even if the sensor housing is attached directly to the swing support and the said has no elastic torsional bar, because due to the spatial arrangement of the sensor directly at the bearing, the sensor will always follow the radial movements of the steering spindle which may be caused by conditions of unbalance, impacts on the vehicle chassis, or radial forces applied to the steering wheel, for example. This way, a possible tilting of the bearing will not effect any change in the distance between the outside bearing bush and the axis of rotation of the spindle (2).

It is especially favorable for the present invention that the attachment according to the present invention in addition may be used as an adapter for adapting the sensor housing (1) to the steering spindle. It is advisable in this respect to detachably couple the steering sensor housing with the adapter so that, in case of need, it is easily possible to replace the housing or adapt it to changed conditions.

A preferred embodiment is recommended for the design of the adapter which is generally composed of a cylinder-shaped sleeve that is fitted to the outside bush of the roller bearing (6), e.g. press-fitted, or connected detachably or undetachably in any other fashion. Succeeding the cylinder-shaped wall in a radial direction is a generally annular-disc shaped projection to which the sensor housing may be attached. The roller bearing or antifriction bearing should preferably have a design resistant to tilting so that tilting of the outside bearing bush with respect to the inside bearing bush and, hence, the spindle is prevented in any case. This may be performed by using several parallel balls (see FIG. 1) or long cylinder-shaped roll bodies, or other arrangements known in the art.

Regarding the connection between the outside bearing bush and the sensor housing, the adapter acts as a connecting member which has already been explained hereinabove, and the adapter can be integrally connected to the outside bearing bush, or the outside bearing bush is passed out of the bearing as an adapter. As explained hereinabove, the adapter may also be integral with the outside bearing bush. Provision should be made in attaching the sensor housing to the adapter that the sensor housing can be aligned centrically or adjusted in relation to the axis of the steering spindle before the attachment action. This may be done by a detachable connection, for example, which in the transverse plane relative to the longitudinal axis of the spindle, permits a certain freedom of motion of the housing relative to the spindle axis prior to the fixing operation, e.g. by a sufficiently large configuration of the attachment holes.

The above-described features are generally based on the fact that the connecting element or angular element is rigidly connected relative to the outside bush of the bearing and the sensor housing is rigidly connected relative to the angular element.

In a preferred embodiment, the sensor housing is floatingly but unrotatably supported, preferably in relation to the swing support (8), in the transverse plane relative to the spindle axis. This may e.g. be effected by radially pointing grooves at the projection of the angular element that extends in a radial direction, into which corresponding projections of the sensor housing project. However, care must be taken in this case that the sensor housing is supported in a radial direction relative to the spindle surface or the spindle axis so that the housing is able to follow the unbalance movements of the spindle.

The support may be achieved by a suitable bearing, for example, whose outside bearing ring makes catch at the sensor housing. Further, care must be taken that the housing is secured in position in relation to the spindle bearing in a longitudinal direction of the spindle axis. This securing-in-position may e.g. be effected by a spring (10) which applies a resilient force to the sensor housing in the direction of the spindle bearing. However, other holding elements such as metal sheets which permit a certain degree of movability of the sensor housing vis-à-vis the bearing housing may also be used. It is not necessary though that the angular element acting as an adapter is rigidly connected to the outside ring of the spindle bearing. It is also possible that the sensor housing is sufficiently displaceable in the radial plane in relation to the facing radial surface of the bearing housing, that means at least in the X-axis, possibly also in the Y-axis. However, there must not be any changes in the unrotatable connection between the sensor housing and the bearing housing. A construction of this type is especially suitable when the outside housing part of the bearing housing is sprung by rubber inserts vis-à-vis the actual roller bearing so that the spindle moves relative to the outside housing part. However, this is no necessity with regard to the suitability of the construction mentioned before.

As explained already, the guide grooves for the sensor housing may be provided in the radial outside surface of the housing itself and in the radial projection of the angular element (adapter 3). It is, however, also possible to install a special adapter disc which is connected to the sensor housing, on the one hand, and is slidable relative to the radial surface of the spindle bearing, on the other hand.

In a preferred embodiment, the housing, too, is displaceable in relation to the adapter disc in a radial direction, with the two directions of displacement between the spindle bearing and the sensor housing being respectively vertical to each other in the radial plane with respect to the adapter disc. The result is that the sensor housing is displaceable in two directions (X-direction and Y-direction) with respect to the bearing in the radial plane and, nevertheless, is arranged unrotatably with respect to the spindle bearing.

a possible design of the entraining member (4) is e.g. disclosed in application P 198 22 825. This measure, too, contributes to eliminating the effect of an impact in the steering spindle (2) or a radial offset of the housing.

DETAILED DESCRIPTION OF THE PREFERRED EMBODIMENTS

Figure 1:
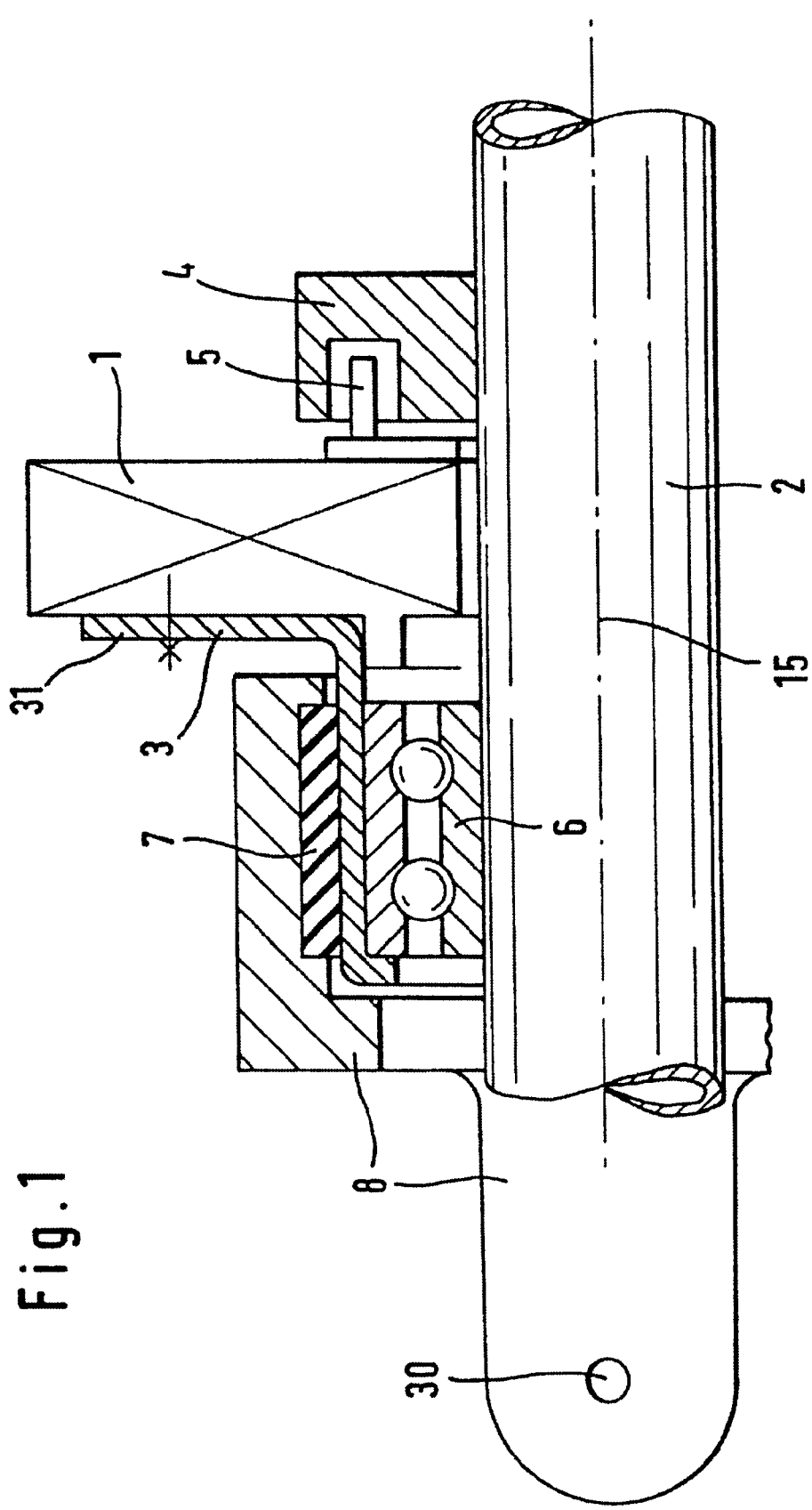
FIG. 1 is a cross-sectional partial view of a first embodiment of the attachment of the sensor to the bearing.

FIG. 1 is a half sectional view of the basic arrangement. The angle of rotation of shaft 2 (steering spindle) shall be sensed by a sensor contained within a sensor housing (1). Sensor housing 1 is centered and attached to adapter 3. Adapter 3 is supported on the ball bearing 6 or is an integral part of the bearing 6, as is shown in FIGS. 2 and 3.

The outside ring of the ball bearing 6 or the adapter 3 is fixed to a swing support (8) at the steering column by way of an elastic torsion bar (7) made of elastomer or rubber. The angle of rotation of the shaft (2) is transmitted by way of the entraining member (4) to the guide pin (5) and, finally, to the encoder disc of the sensor within sensor housing (1). It is ensured by the described design that the angle of rotation of the shaft (2) is represented exactly at the encoder of the sensor despite the geometrical misalignment.

Figure 4:
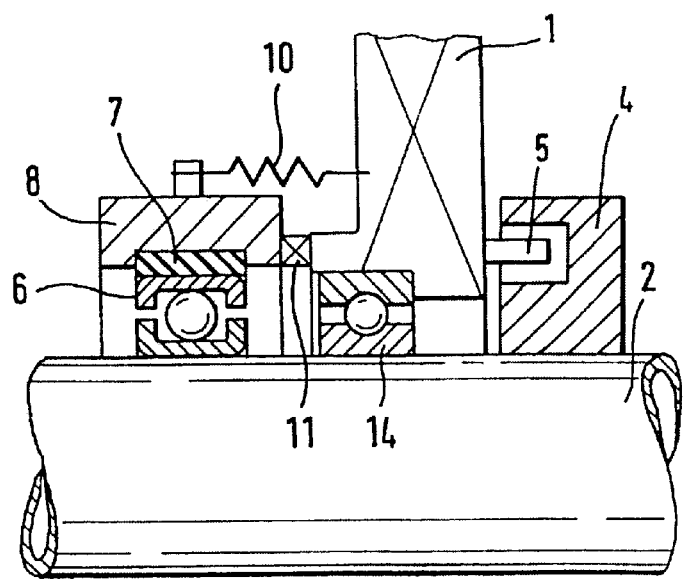
FIG. 4 is a mounting support of the sensor in relation to the spindle with a direct force transmission between the housings of the spindle bearing and the sensor.

FIG. 4 shows another variation wherein the rotatory misalignment is compensated by a second ball bearing (14). The unrotatable axial coupling to the swing support (8) is carried out by way of a locking mechanism (11) in an axial and circumferential direction, the axial forces being realized by way of elastic links (10).

Figure 2:
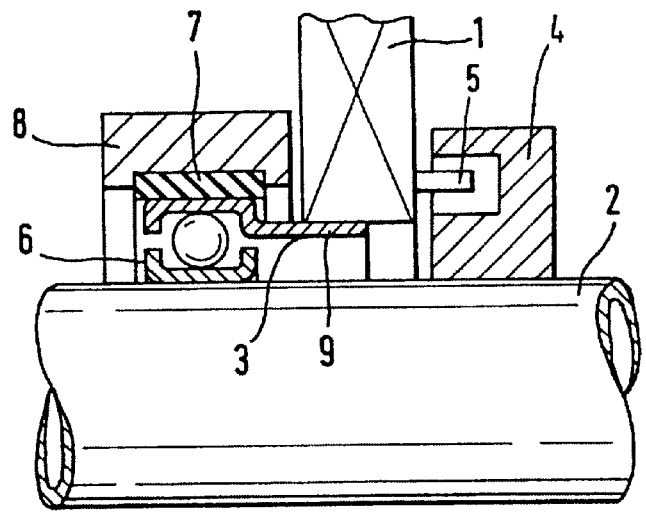
FIG. 2 is a partial view of a second embodiment wherein the connecting device (adapter or angular element) is integrally united with the outside bearing bush, and the connecting element makes catch at the inner peripheral surface of the sensor housing.
Figure 3:
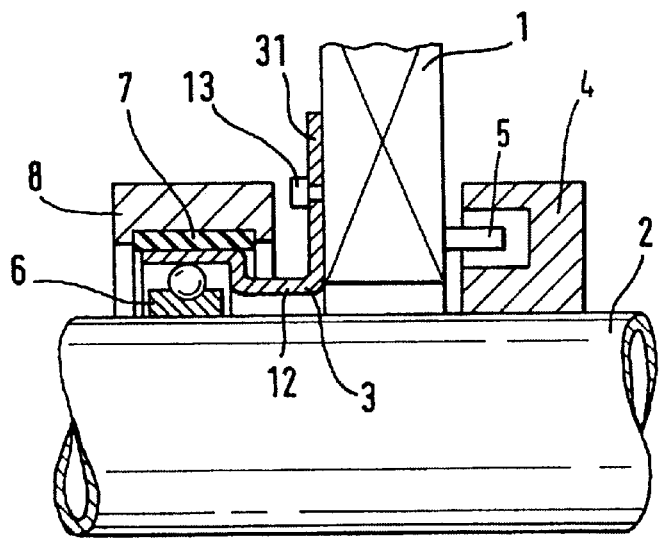
FIG. 3 is an embodiment of FIG. 2 wherein the connecting element has a radial shoulder to which the sensor is attached.

Variations of the embodiment of FIG. 1 are shown in FIGS. 2 and 3. In FIG. 2, the adapter that acts as a connecting device is integrally united with the outside bearing bush of the ball bearing (6) so that the outside ring of the cage is provided with a flange (9) to which the sensor housing (1) can be fastened in a detachable or undetachable manner. FIG. 3 differs from FIG. 2 mainly in that the flange (9) has been replaced by an axial flange (12) which extends in a radial direction. In all other respects, the same conditions may prevail as described in connection with FIG. 1. The fixation at the fixing point (13) is preferably detachable, and an adjustment of the sensor should be possible, however, fixation may also be undetachable. It should be noted with respect to the principle of the steering angle sensor that the housing is retained relative to the swing support (8) while the entraining member (4) secured on the spindle (2) turns along with the spindle. The entraining member (4) has a groove-shaped recess into which a guide pin or retaining pin (5) projects. The retaining pin causes rotary movement of a measuring element which is pivoted within the sensor housing. The steering angle of the spindle or the steering angle velocity can be determined by way of the rotation or the rotational position of the measuring element by probes stationary on the sensor housing.

Figure 5:
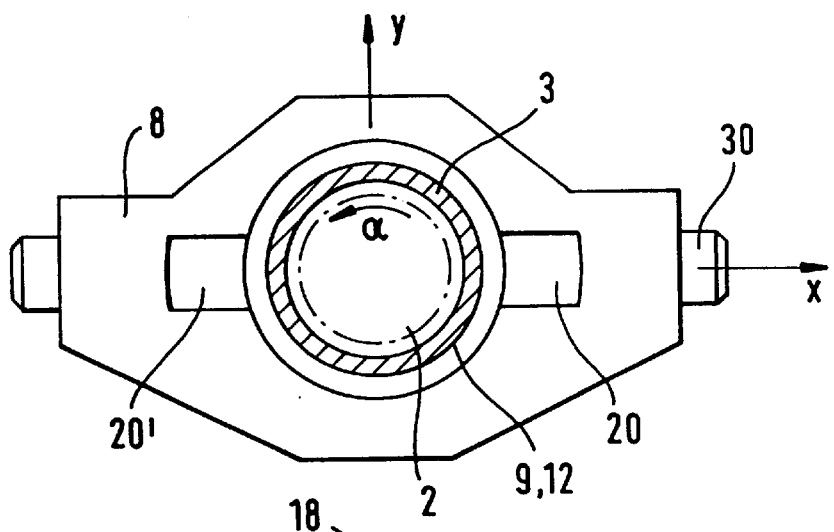
FIG. 5 is a top view of the spindle bearing, viewed from the sensor, with a groove guide in the X-direction for the sensor housing.
Figure 6:
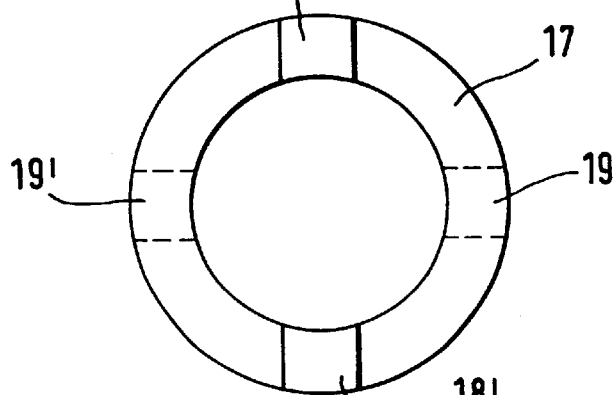
FIG. 6 is an adapter disc with projections which permit movability of the disc in the X-direction in relation to the spindle bearing.
Figure 7:
FIG. 7 is a side view of the adapter disc according to FIG. 6.
Figure 8:
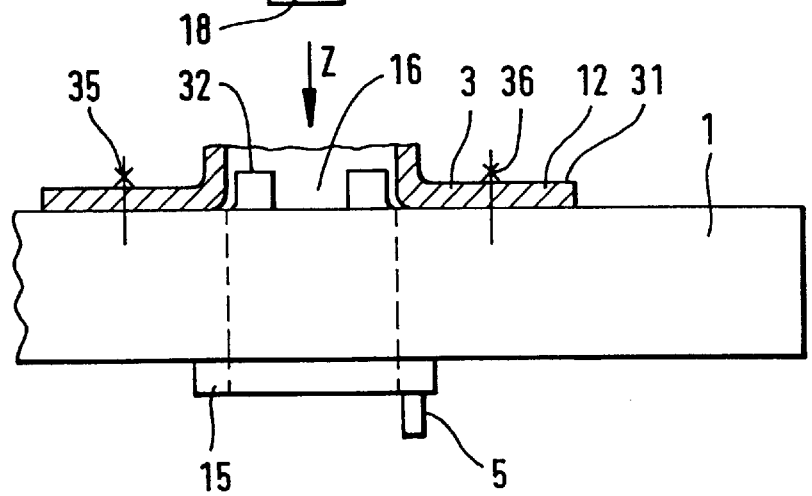
FIG. 8 is a partial view of a sensor with a guide pointing to the viewer in the Y-direction of the sensor with respect to the adapter disc.

FIG. 5 shows a top view of a swing support (8) when viewed from the sensor (1). The swing support has two projecting pivot pins (30) (also indicated in FIG. 1) which lie on a joint X-axis about which the swing support (8) can swing. Projecting through the inside recess of the swing support (8) is the spindle or shaft (2) which is embraced by the adapter (3). The adapter has a flange (9) or (1 2), as illustrated in FIG. 2 or 3, which projects annularly from the housing of the swing support and is shown in a cross-sectional view in FIG. 5. As can be seen in FIGS. 8 and 3, sensor housing (1) can be attached in a centered fashion to the projection (31) of the flange which extends in a radial direction. The configurations according to FIGS. 2 and 3 presuppose an unrotatable attachment of the adapter (3) relative to the housing of the swing support (8) what can be achieved by means of the friction forces exercised by the torsion bar (7). Thus, an unrotatable rubber coupling between adapter (3) and swing support (8) is required. An unrotatable connection of this type cannot always be achieved at low cost over the useful life of the vehicle. In addition, such a rubber connection is not especially resistant to torsion because the rubber must allow a radial deflection of the shaft (2). Therefore, FIGS. 5 to 8 also show a form lock in a circumferential direction between the swing support (8) and the sensor (1) or the adapter (3) by way of an adapter disc (17), as shown in FIGS. 6 and 7. This adapter disc (17) is very advantageous in particular when the adapter (3) is rotatable in relation to the housing of the swing support (8) (for example, by omission of the elastic torsion bar (7) in FIG. 1 to FIG. 4). To achieve torsional strength between the sensor (1) and the swing support housing, the adapter disc (17) ensures slidability of the sensor in the X- and Y-direction in relation to the swing support (8). However, rotation of the sensor with respect to the swing support housing (8) is not possible. This is achieved more specifically because the adapter disc (17) is furnished with guide projections (19) and (19') which allow a movement of the adapter disc (17) in the X-direction relative to the housing of the swing support (8) because they are slidable in associated guide grooves (20) of the swing support by an appropriate distance in the X-direction. Rotation of the adapter disc (17) relative to the housing of the swing support (8) is not possible though.

Figure 9:
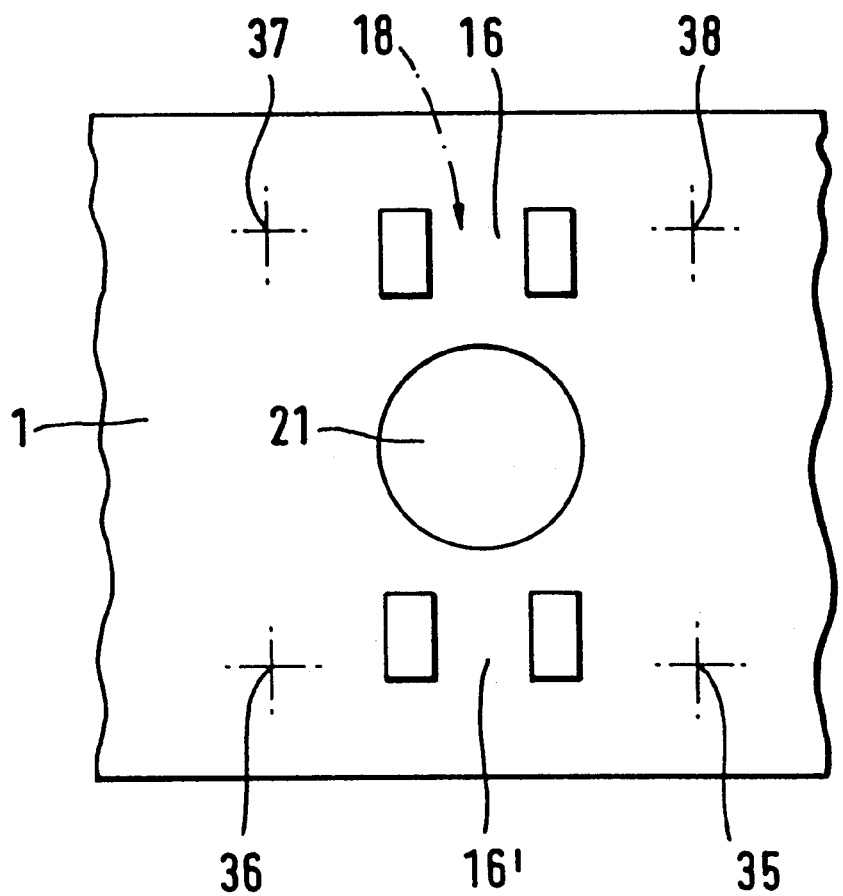
FIG. 9 is a partial top view of the sensor according to FIG. 8.

On the other hand, a guide nose (18) and (18') at the adapter disc (17) which slides in a mating groove-type guide recess (16) of the sensor (1) allows movement of the sensor in the Y-direction in relation to the housing of the swing support (8), whereas rotation is again prevented. Thus, the sensor (1) is displaceable within limits in relation to the swing support in the radial plane to the spindle in the X- and Y-direction, but is not rotatable. Hence, the rotation-prevention arrangement is achieved by means of the adapter disc (17) instead of the friction forces of the torsion bar (7). However, it is not absolutely necessary to configure the guide recess (16) in the housing of the sensor (1), as is shown in FIGS. 8 and 9. Instead, the guide recess may be machined in the radial projection (31). The guide noses (32) in the housing of the sensor (1) may be omitted in this case. It has already been explained that the attachment of the sensor housing should be done in a centered fashion by means of the fastening points (35 to 38) depicted in FIG. 9.

However, it is also possible to omit the adapter disc when provisions are made that the sensor housing is secured, for example, at a distance from the steering spindle by an appropriate separate bearing. The result is a construction similar to the one shown in FIG. 4. Further, it must be ensured in this case that the sensor housing (1) is held under preload against the housing of the swing support (8) which can be effected, for example, by a spring (10) shown in FIG. 4 or by a plurality of these springs distributed on the circumference of the housings. Still further, groove and pivot of the mating parts can be exchanged in the described groove-and-pivot connections without special difficulties being involved.

An advantage of the present invention, especially with respect to the embodiment of FIG. 4, and the relating improvements according to FIGS. 6 to 9 resides in that a certain tolerance compensation may occur also with respect to the longitudinal axis of the steering spindle (2) inasfar as the torsional strength of the system is not impaired thereby.

What is claimed is:

1. A steering angle sensor for installation on a steering spindle, comprising:

a sensor housing retaining a sensor therein, the sensor housing unrotatably attached to a swing support wherein the sensor housing contains a guide pin;

an entraining member fixedly attached to the steering spindle, wherein the entraining member is adapted to drive the guide pin;

an adapter attaching the swing support to the sensor housing; and an elastic torsion positioned between, and affixing the adapter to the swing support.

2. A steering angle sensor for installation on a steering spindle, comprising:

a sensor housing retaining a sensor therein, the sensor housing unrotatably attached to a swing support wherein the sensor housing contains a guide pin;

an entraining member fixedly attached to the steering spindle, wherein the entraining member is adapted to drive the guide pin;

an adapter attaching the swing support to the sensor housing; and an adapter disc interposed between the sensor housing and the swing support, the adapter disc having first projections received in guide grooves in the swing support thereby permitting lateral translation in a first X-direction, the adapter disc further having a guide nose received in a guide recess of the sensor housing thereby permitting translation in a second Y-direction while maintaining the swing support and the sensor housing in a rotationally fixed relationship one with the other.

3. The steering angle sensor of claim 2, wherein the adapter is secured to an outside portion of a roller bearing.

4. The steering angle sensor as claimed in claim 1, wherein the adapter includes at least one angular element extending away from the sensor housing at an angle.

5. The steering angle sensor as claimed in claim 4, wherein the adapter has a generally cylinder-shaped wall which contacts the roller bearing, wherein the wall is connected to at least one projection that extends in a radial direction and to which the sensor housing is fastened.

6. The steering angle sensor as claimed in claim 1, wherein the sensor housing is supported relative to the steering spindle by a pivot bearing and is secured in an axial direction in relation to the steering spindle by a holding element.

7. The steering angle sensor mount as claimed in claim 6, wherein the holding element comprises a spring which applies a force to the sensor housing which is directed axially to a housing of the roller bearing.

8. The steering angle sensor as claimed in claim 3, wherein the adapter disc is displaceable in relation to the roller bearing.

9. The steering angle sensor as claimed in claim 3, wherein the sensor housing is displaceable in relation to the swing support in a first and second direction in a radial plane, and the first direction and the second direction are vertical to one another in the plane.

10. The steering angle sensor as claimed in claim 1, wherein the adapter is secured to an outside portion of a roller bearing.

11. The steering angle sensor as claimed in claim 2, wherein the roller bearing is resistant to tilting.

* * * * *